(12) United States Patent
Yamane et al.

(10) Patent No.: US 11,197,048 B2
(45) Date of Patent: *Dec. 7, 2021

(54) TRANSMISSION DEVICE, TRANSMISSION METHOD, RECEPTION DEVICE, AND RECEPTION METHOD

(71) Applicant: Saturn Licensing LLC, New York, NY (US)

(72) Inventors: Taketoshi Yamane, Kanagawa (JP); Yasuaki Yamagishi, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 90 days.

This patent is subject to a terminal disclaimer.

(21) Appl. No.: 16/656,077

(22) Filed: Oct. 17, 2019

(65) Prior Publication Data

US 2020/0053412 A1 Feb. 13, 2020

Related U.S. Application Data

(63) Continuation of application No. 15/322,769, filed as application No. PCT/JP2015/068964 on Jul. 1, 2015, now Pat. No. 10,491,934.

(30) Foreign Application Priority Data

Jul. 14, 2014 (JP) ................................ 2014-144143

(51) Int. Cl.
*H04N 21/262* (2011.01)
*H04N 21/472* (2011.01)
(Continued)

(52) U.S. Cl.
CPC ..... *H04N 21/26283* (2013.01); *G10L 13/027* (2013.01); *H04H 60/72* (2013.01);
(Continued)

(58) Field of Classification Search
None
See application file for complete search history.

(56) References Cited

U.S. PATENT DOCUMENTS 7,610,546 B1 10/2009 Nagao et al.
7,877,259 B2 1/2011 Marple et al.
(Continued)

FOREIGN PATENT DOCUMENTS

JP H09-258763 A 10/1997
JP 2001-022374 A 1/2001
(Continued)

OTHER PUBLICATIONS

Brazilian Office Action dated Jul. 14, 2020 in Patent Application No. BR112017000101-2 (with partial English translation).
(Continued)

*Primary Examiner* — Justin E Shepard
(74) *Attorney, Agent, or Firm* — Oblon, McClelland, Maier & Neustadt, L.L.P.

(57) ABSTRACT

The present technology relates to a transmission device, a transmission method, a reception device, and a reception method that can enhance the accessibility for people with visual disabilities. The transmission device includes: a text-to-speech utterance metadata generation unit that generates text-to-speech utterance metadata about the text-to-speech utterance of display information as the producer intends; an electronic program information generation unit that generates electronic program information including the text-to-speech utterance metadata; and a transmission unit that transmits the electronic program information to the reception device capable of displaying the display information. The present technology can be applied, for example, to a transmitter capable of transmitting a digital broadcast signal.

18 Claims, 19 Drawing Sheets

(51) Int. Cl.
    *H04N 21/47*      (2011.01)
    *H04N 21/482*     (2011.01)
    *H04N 21/4722*    (2011.01)
    *H04N 21/478*     (2011.01)
    *H04H 60/72*      (2008.01)
    *H04H 60/73*      (2008.01)
    *G10L 13/027*     (2013.01)
    *H04N 21/488*     (2011.01)
    *G10L 13/00*      (2006.01)

(52) U.S. Cl.
    CPC ............ *H04H 60/73* (2013.01); *H04N 21/47* (2013.01); *H04N 21/472* (2013.01); *H04N 21/478* (2013.01); *H04N 21/4722* (2013.01); *H04N 21/47217* (2013.01); *H04N 21/482* (2013.01); *H04N 21/4821* (2013.01); *H04N 21/4884* (2013.01); *G10L 13/00* (2013.01)

(56) References Cited

U.S. PATENT DOCUMENTS

| | | |
|---|---|---|
| 8,214,216 B2 | 7/2012 | Sato |
| 2006/0262751 A1 | 11/2006 | Vermola et al. |
| 2008/0017722 A1 | 1/2008 | Syder et al. |
| 2008/0045199 A1 | 2/2008 | Lee |
| 2009/0018795 A1 | 1/2009 | Priester et al. |
| 2009/0026570 A1 | 1/2009 | Higashi et al. |
| 2009/0187950 A1 | 7/2009 | Nicas et al. |
| 2009/0259473 A1 | 10/2009 | Chang et al. |
| 2009/0265700 A1 | 10/2009 | Lee et al. |
| 2011/0202344 A1 | 8/2011 | Meyer et al. |
| 2012/0001667 A1 | 1/2012 | Tsubouchi et al. |
| 2012/0016675 A1 | 1/2012 | Hopkins et al. |
| 2012/0323578 A1 | 12/2012 | Kubota |
| 2014/0001015 A1 | 1/2014 | Slack |
| 2014/0010154 A1 | 1/2014 | Hong et al. |

FOREIGN PATENT DOCUMENTS

| | | |
|---|---|---|
| JP | 2001-043215 A | 2/2001 |
| JP | 2006-100892 A | 4/2006 |
| JP | 2009-204711 A | 9/2009 |
| JP | 2009-525218 A | 12/2009 |
| JP | 2009-545218 | 12/2009 |
| JP | 2011-188170 A | 9/2011 |
| JP | 2012-022447 A | 2/2012 |
| JP | 2014-038209 A | 2/2014 |
| KR | 10-2012-0097378 A | 9/2012 |

OTHER PUBLICATIONS

Extended Search Report issued in European Application No. 15821756.2 dated Nov. 16, 2017.

Search Report and Written Opinion dated Oct. 26, 2017 in Singaporean Application No. 11201700130V.

Paul Taylor et al., "SSML: A speech synthesis markup language", Speech Communication, Elsevier Science Publishers, Amsterdam, NL, vol. 21, No. 1-2, Feb. 1, 1997, pp. 1-11.

Office Action issued in corresponding Japanese Application No. 2016-534361 dated Aug. 8, 2019.

Japanese Office Action dated Aug. 8, 2019 in Japanese Application No. 2016-534361, 7 pages.

*FIG. 11*

```
Service
    id
    version
    validFrom
    validTo
    globalServiceID
    weight
    baseCID
    ServiceType
    Name
    Description
    AudioLanguage
        languageSDPTag
    TextLanguage
        languageSDPTag
    ParentalRating
        ratingSystem
        ratingValueName
    Genre
    Extension
        uri
        Description
    PreviewDataReference
        idRef
        usage
    PrivateExt
```

FIG. 12

```
Content
    id
    version
    validFrom
    validTo
    globalContentID
    baseCID
    ServiceReference
        idRef
        weight
    Name
    Description
    SteatTime
    EndTime
    AudioLanguage
        languageSDPTag
    TextLanguage
        languageSDPTag
    Legth
    ParentalRating
        ratingSystem
        ratingValueName
    Genre
    Extension
        uri
        Description
    PreviewDataReference
        idRef
        usage
    PrivateExt
```

FIG. 13

| Name | Type | Category | Cardinality | Description | Data Type |
|---|---|---|---|---|---|
| Name | E1 | NM/TM | 1..N | Name of the 'Content' fragment, possibly in multiple languages. The language is expressed using built-in XML attribute 'xml:lang' with this element. | string |
| PhoneticInfo URI | E2 | NM/TM | 0..N | The URI address where phoneticInfo object for parenet Name element is acquired. Phonetic file may be encoded in SSML format (http://www.w3.org/TR/css3-speech/) or similar types of mark up languages. | anyURI |
| Type | A | NM/TM | 0..1 | Representation format of phoneticInfo object. | anyURI |
| PhoneticInfo | E2 | NM/TM | 0..N | Embedded phoneticInfo object for parent Name element. | string |
| Type | A | NM/TM | 0..1 | Representation format of phoneticInfo object. | anyURI |
| Description | E1 | NM/TM | 0..N | Description, possibly in multiple languages. The language is expressed using built-in XML attribute 'xml:lang' with this element. | string |
| PhoneticInfo URI | E2 | NM/TM | 0..N | The URI address where phoneticInfo object for parenet Description element is acquired. Phonetic file may be encoded in SSML format (http://www.w3.org/TR/css3-speech/) or similar types of mark up languages. | anyURI |
| Type | A | NM/TM | 0..1 | Representation format of phoneticInfo object. | anyURI |
| PhoneticInfo | E2 | NM/TM | 0..N | Embedded phoneticInfo object for parent Description element. | string |
| Type | A | NM/TM | 0..1 | Representation format of phoneticInfo object. | anyURI |

FIG. 14

| Name | Type | Category | Cardinality | Description | Data Type |
|---|---|---|---|---|---|
| Picture | E1 | NM/TM | 0..N | Picture defines how to obtain a picture which can enable the user to preview the service or content, or represents the service or content with an icon, a logo, etc. The associated picture can be represented with binary data embedded in the 'PreviewData' fragment or be referenced by URI Contains the following attribute:relativePreference … | |
| relativePreference | A | NM/TM | 0..1 | This attribute gives the relative preference of this element. The greater value has higher priority to handle (i.e. 2 has higher priority than 1). If multiple media elements are instantiated in this 'PreviewData' fragment, then all the elements SHALL have the 'relativePreference' attribute instantiated and SHALL have mutually exclusive values of this attribute. If only a single element is instantiated in this 'PreviewData' fragment then the 'relativePreference' attribute MAY be instantiated for that element. | unsignedInt |
| PhoneticInfoURI | E2 | NM/TM | 0..N | The URI address where phoneticInfo object for parent Picture element is acquired. Phonetic file may be encoded in SSML format (http://www.w3.org/TR/css3-speech/) or similar types of mark up languages. | anyURI |
| Type | A | NM/TM | 0..1 | Representation format of phoneticInfo object. | anyURI |
| PhoneticInfo | E2 | NM/TM | 0..N | Embedded phoneticInfo object for parent Picture element. | string |
| Type | A | NM/TM | 0..1 | Representation format of phoneticInfo object. | anyURI |

```
<ELEMENT OF text OR picture TO BE READ ALOUD>
<PhoneticInfoURI type="ENCODING FORMAT IDENTIFICATION URI OF TEXT-TO-SPEECH UTTERANCE METADATA">
"ADDRESS FOR ACQUIRING TEXT-TO-SPEECH UTTERANCE METADATA"
</PhoneticInfoURI>
</ELEMENT OF text OR picture TO BE READ ALOUD>
```

```
<ELEMENT OF text OR picture TO BE READ ALOUD>
<PhoneticInfo type="ENCODING FORMAT IDENTIFICATION URI OF TEXT-TO-SPEECH UTTERANCE METADATA">
"CONTENT OF TEXT-TO-SPEECH UTTERANCE METADATA"
</PhoneticInfo>
</ELEMENT OF text OR picture TO BE READ ALOUD>
```

```
<?xml version="1.0"?>
<speak version="1.1" xmlns="http://www.w3.org/2001/10/synthesis"
    xmlns:xsi="http://www.w3.org/2001/XMLSchema-instance"
    xsi:schemaLocation="http://www.w3.org/2001/10/synthesis
        http://www.w3.org/TR/speech-synthesis11/synthesis.xsd"
    xml:lang="en-US">
<sub alias="World Wide Web Consortium">W3C</sub>
<!-- World Wide Web Consortium -->
</speak>
```

FIG. 18

```
<?xml version="1.0" encoding="ISO-8859-1"?>
<speak version="1.0" xmlns="http://www.w3.org/2001/10/synthesis"
    xmlns:xsi="http://www.w3.org/2001/XMLSchema-instance"
    xsi:schemaLocation="http://www.w3.org/2001/10/synthesis
        http://www.w3.org/TR/speech-synthesis/synthesis.xsd"
    xml:lang="en-US">

The title of the movie is:
<phoneme alphabet="ipa"
    ph="ˈlɑːviːɾəˈʔeɪˈbɛlə:">
La vita è bella </phoneme>
<!-- The IPA pronunciation is 'la 'vi:ɾa 'ʔeɪ 'bɛlə --->
(Life is beautiful),
which is directed by
<phoneme alphabet="ipa"
    ph="ɹəˈbɛːbɹɾoʊ
bɛˈniːnji">
Roberto Benigni </phoneme>
<!-- The IPA pronunciation is ɹəˈbɛːɹɾoʊ bəˈniːnji --->

<!-- Note that in actual practice an author might change the
    encoding to UTF-8 and directly use the Unicode characters in
    the document rather than using the escapes as shown.
    The escaped values are shown for ease of copying. --->
</speak>
```

FIG. 19

```
<?xml version="1.0"?>
<speak version="1.1" xmlns="http://www.w3.org/2001/10/synthesis"
    xmlns:xsi="http://www.w3.org/2001/XMLSchema-instance"
    xsi:schemaLocation="http://www.w3.org/2001/10/synthesis
        http://www.w3.org/TR/speech-synthesis11/synthesis.xsd"
    xml:lang="en-US">

<!-- Empty element -->
Please say your name after the tone.  <audio src="beep.wav"/>

<!-- Container element with alternative text -->
<audio src="prompt.au">What city do you want to fly from?</audio>
<audio src="welcome.wav">
<emphasis>Welcome</emphasis> to the Voice Portal.
</audio>

</speak>
```

US 11,197,048 B2

TRANSMISSION DEVICE, TRANSMISSION METHOD, RECEPTION DEVICE, AND RECEPTION METHOD

CROSS REFERENCE TO RELATED APPLICATIONS

This application is a continuation of U.S. application Ser. No. 15/322,769, filed on Dec. 29, 2016, which is a U.S. National Phase Application of International Application No. PCT/JP2015/068964, filed on Jul. 1, 2015, which claims priority benefit of Japanese Application No. 2014-144143, filed on Jul. 14, 2014. Each of the above-referenced applications is hereby incorporated by reference in its entirety.

TECHNICAL FIELD

The present technology relates to a transmission device, a transmission method, a reception device, and a reception method, and particularly relates to a transmission device, a transmission method, a reception device, and a reception method that can enhance the accessibility for people with visual disabilities.

BACKGROUND ART

In the field of digital broadcasting, the accessibility for people with visual disabilities is required (for example, see Patent Document 1).

Especially, the 21st Century Communications and Video Accessibility Act of 2010 (CVAA), or the so-called American accessibility act was enacted in the United States. Federal Communications Commission (FCC) has published various regulations on the accessibility based on the act.

CITATION LIST

Patent Document

Patent Document 1: Japanese Patent Application Laid-Open No. 2009-204711

SUMMARY OF THE INVENTION

Problems to be Solved by the Invention

By the way, when a user interface (UI), for example, for program information is presented to people with visual disabilities, the text information of the program information is read aloud with a Text To Speech (TTS) engine. This is a typical way to enhance the accessibility.

However, when the TTS engine is used, the text information is not necessarily read aloud as the producer of the program information intends. It is uncertain whether people with visual disabilities can receive the information similar to the information that able-bodied people receive. In light of the foregoing, a technology with which utterance as the producer intends is surely performed so that people with visual disabilities can receive the information similar to the information that able-bodied people receive.

In light of the forgoing, the present technology enables the enhancement in the accessibility for people with visual disabilities by surely performing utterance as the producer intends.

Solutions to Problems

A transmission device according to a first aspect of the present technology includes: a metadata generation unit that generates metadata about text-to-speech utterance of display information, the text-to-speech utterance being performed as a producer intends; an electronic program information generation unit that generates electronic program information including the metadata; and a transmission unit that transmits the electronic program information to a reception device capable of displaying the display information.

The metadata can include information about utterance of a character string of which pronunciation is not uniquely determined, or a character string difficult to pronounce.

The display information can include information or an icon of a content.

A content acquisition unit that acquires the content can be further included, and the transmission unit can transmit the electronic program information together with the content using a digital broadcast signal.

The electronic program information can comply with Electronic Service Guide (ESG) prescribed in Open Mobile Alliance-Mobile Broadcast Services Enabler Suite (OMA-BCAST), the metadata can be described in a Speech Synthesis Markup Language (SSML) format, and a predetermined fragment included in the ESG can include address information indicating an address at which a file of the metadata described in the SSML format is acquired, or content of the metadata described in the SSML format.

The transmission device can be an independent device, or can be an internal block included in a device.

The transmission method according to the first aspect of the present technology corresponds to the transmission device according to the first aspect of the present technology.

In the transmission device and transmission method according to the first aspect of the present technology, the metadata about the text-to-speech utterance that the producer intends is generated for display information, and the electronic program information including the metadata is generated. Then, the electronic program information is transmitted to a reception device capable of displaying the display information.

A reception device according to a second aspect of the present technology includes: a reception unit that receives electronic program information, the electronic program information being transmitted from a transmission device, the electronic program information including the metadata about text-to-speech utterance of display information, the text-to-speech utterance being performed as a producer intends; a metadata acquisition unit that acquires the metadata included in the electronic program information; and a text-to-speech reading aloud unit that reads the display information aloud on the basis of the metadata.

The metadata can include information about utterance of a character string of which pronunciation is not uniquely determined, or a character string difficult to pronounce.

The display information can include information or an icon of a content.

The reception unit can receive the electronic program information transmitted together with the content as a digital broadcast signal.

The electronic program information can comply with ESG prescribed in OMA-BCAST, the metadata can be described in an SSML format, a predetermined fragment included in the ESG can include address information indicating an address at which a file of the metadata described in the SSML format is acquired, or content of the metadata described in the SSML format, and the metadata acquisition unit can acquire the file of the metadata in accordance with the address information, or acquires the metadata from the fragment.

The reception device can be an independent device, or can be an internal block included in a device.

The reception method according to the second aspect of the present technology corresponds to the reception device according to the second aspect of the present technology.

In the reception device and reception method according to the second aspect of the present technology, the electronic program information, which includes the metadata about the text-to-speech utterance of the display information as the producer intends and is transmitted from the transmission device, is received. Then, the metadata included in the electronic program information is acquired, and the display information is read aloud on the basis of the metadata.

Effects of the Invention

According to the first aspect and the second aspect of the present technology, the accessibility for people with visual disabilities can be enhanced.

Note that the effects of the present technology are not necessarily limited to the effect described above, and can be any one of the effects described herein.

BRIEF DESCRIPTION OF THE DRAWINGS

FIG. 11 is a diagram of an exemplary configuration of a service fragment of ESG.

FIG. 12 is a diagram of an exemplary configuration of a content fragment of ESG.

FIG. 13 is a diagram of an exemplary configuration of extended ESG.

FIG. 14 is a diagram of another exemplary configuration of extended ESG.

FIG. 18 is a diagram of an exemplary description of a phoneme element in an SSML format.

FIG. 19 is a diagram of an exemplary description of an audio element in an SSML format.

MODE FOR CARRYING OUT THE INVENTION

The embodiments of the present technology will be described hereinafter with reference to the appended drawings. Note that the embodiments will be described in the following order.

1. Outline of Text-to-speech Utterance Metadata of Present Technology
2. Configuration of System
3. Arrangement of Text-to-speech Utterance Metadata with Extension of ESG
4. Exemplary Description of Text-to-speech Utterance Metadata
5. Flow of Process Performed in Each Device
6. Exemplary Variation
7. Configuration of Computer <1. Outline of Text-to-Speech Utterance Metadata of Present Technology>

Among the Federal communications commission's regulations related to the American accessibility act, the regulation on a user interface (FCC Report & Order (FCC 13-138) released Oct. 31, 2013. C.F.R. Title 47.sctn.79.107, 108) requires that the user interfaces on a receiver capable of displaying a video program, such as a television receiver, be accessible for people with visual disabilities.

Figure 1:
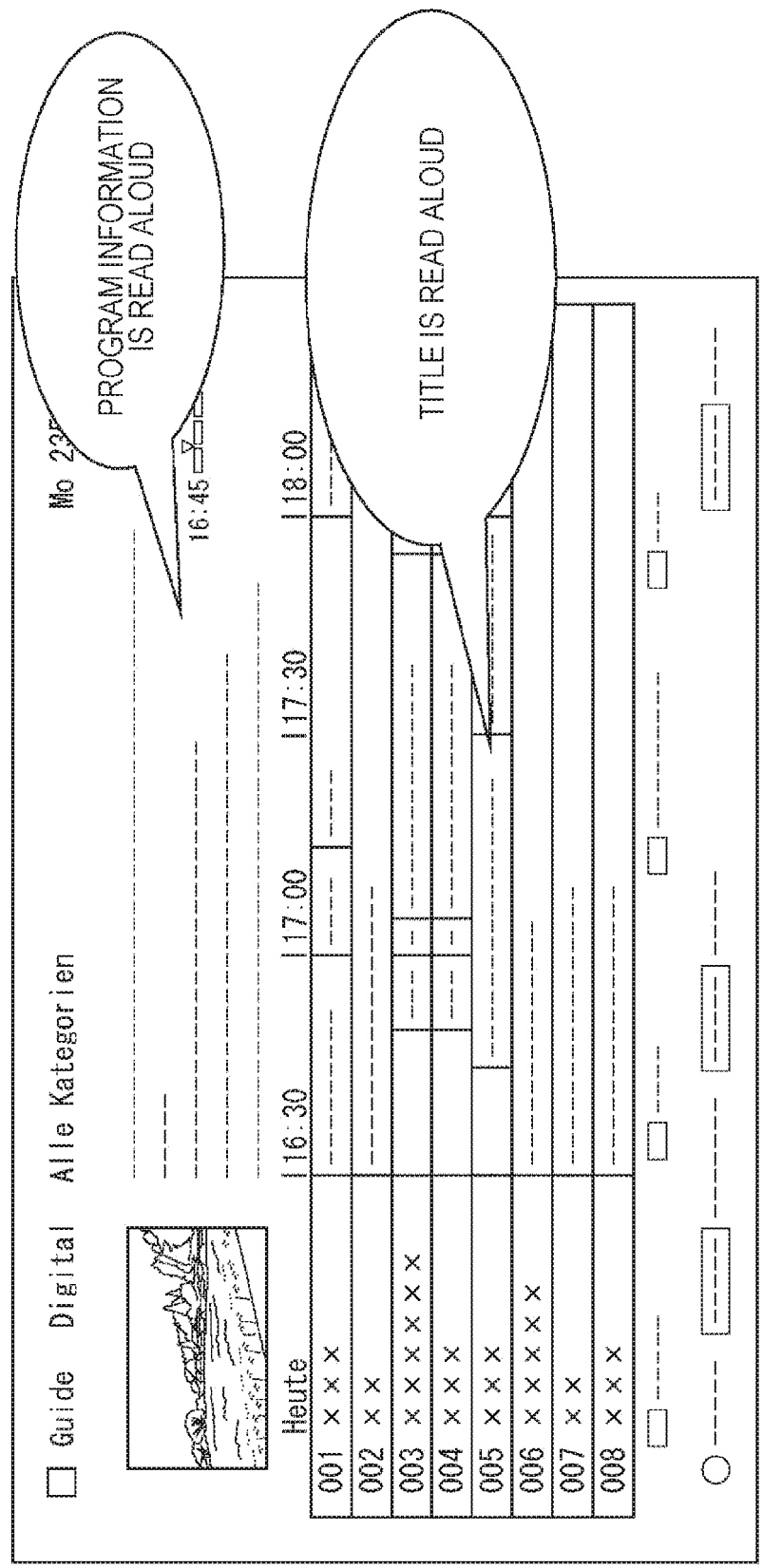
FIG. 1 is a diagram of an example in which program information and a title are read aloud.

Specifically, when a screen of Electronic Service Guide (ESG), namely, an ESG screen is displayed as illustrated in FIG. 1, for example, the program information and a title are read aloud. This can provide the information necessary to select a station of a broadcast program to people with visual disabilities.

Figure 2:
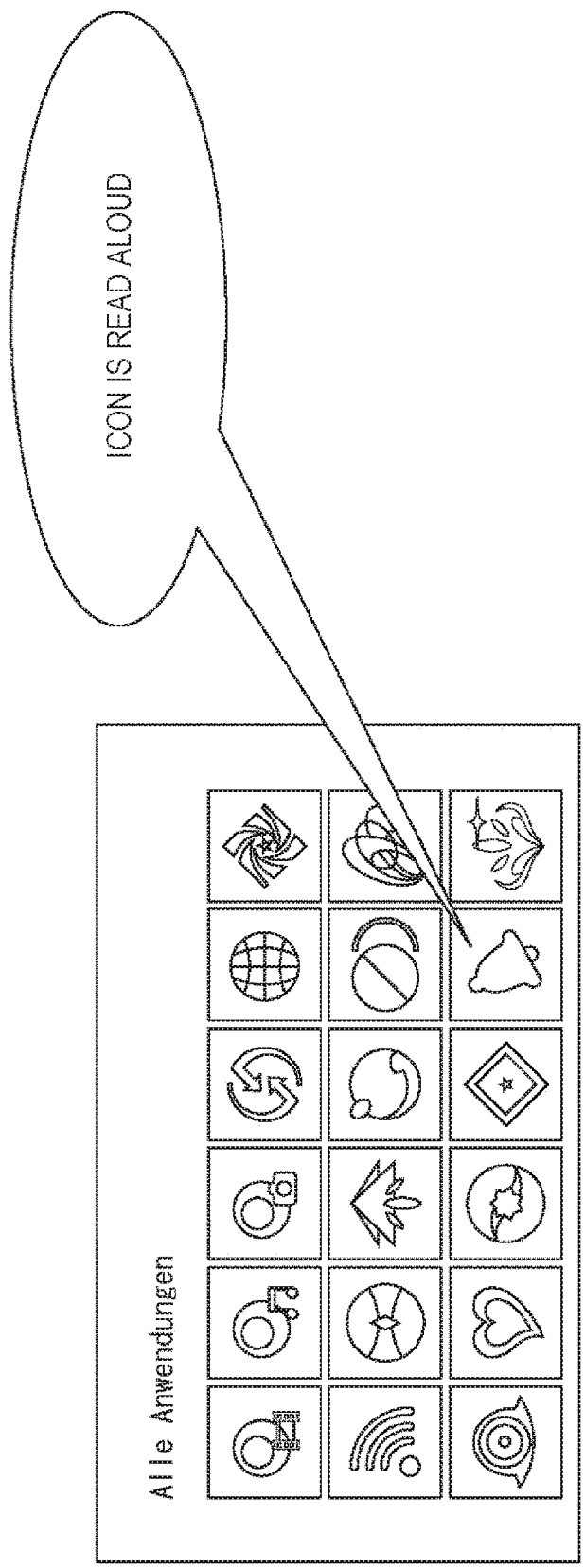
FIG. 2 is a diagram of an example in which an icon is read aloud.

Alternatively, when a menu screen is displayed as illustrated in FIG. 2, for example, the content of a service indicated by each icon is read aloud. This can provide the content of the service to people with visual disabilities.

As described above, the information about the user interface displayed on the receiver is read aloud. This enables people with visual disabilities to acquire the information about the user interface and perform various operations of the receiver.

Meanwhile, the channel information or program information for selecting the station of a broadcast program (program) is provided as the ESG information from a transmitter, for example, of a broadcast station to receivers. The ESG information mainly includes text information or logo data. Then, the receiver generates and displays an ESG screen for selecting the station of a broadcast program on the basis of the ESG information.

As described above, when an ESG screen is displayed, the accessibility of the user interface for people with visual disabilities is required and, for example, a title or program information is read aloud. In such a case, the text information of the title or the program information is typically read aloud with a Text To Speech (TTS) engine. The TTS engine is a voice synthesizer (Text To Speech Synthesizer) that can artificially create human voice from text information.

However, the TTS engine does not necessarily read aloud the text information as the producer of the user interface intends. It is uncertain that people with visual disabilities can receive the information similar to the information that able-bodied people receive.

Figure 3:
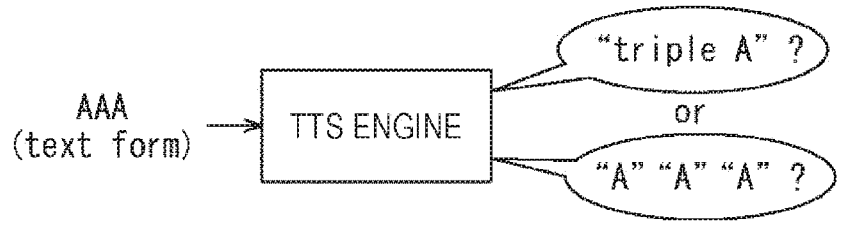
FIG. 3 is an explanatory diagram of an example in which text information is read aloud with an existing TTS engine.

Specifically, for example, when the text information is "AAA" as illustrated in FIG. 3, the text information can be said either "triple A" or "A A A". The pronunciation is not uniquely determined. Thus, it is difficult for the TTS engine to determine how to read the text information aloud. As a result, the text information is likely not to be read aloud as the producer intends.

Figure 4:
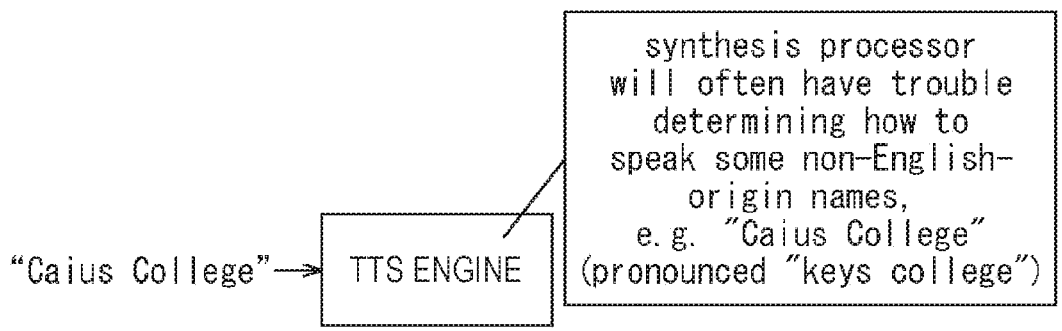
FIG. 4 is an explanatory diagram of an example in which text information is read aloud with an existing TTS engine.

Alternatively, for example, when the text information is "Caius College" as illustrated in FIG. 4, the text information is a proper noun difficult to pronounce. Thus, it is difficult for the TTS engine to determine how to read the text information aloud. As a result, the text information is likely not to be read aloud as the producer intends.

When the pronunciation of the text information is not uniquely determined, or when the text information is, for example, a proper noun difficult to pronounce as described above, there is possibility that the text information is not read aloud as the producer intends. Thus, there is need for a technique with which utterance as the produce intends is surely performed and people with visual disabilities can receive the information similar to the information that able-bodied people receive.

In light of the foregoing, according to the present technology, the information about text-to-speech utterance that the producer intends (hereinafter, referred to as "text-to-speech utterance metadata") is provided to the TTS engine so that the TTS engine can emit the voice that the producer intends in order to perform text-to-speech utterance as the producer intends to read the display information, for example, of the user interface aloud. Note that the text-to-speech utterance metadata can be included in the ESG information.

Figure 5:
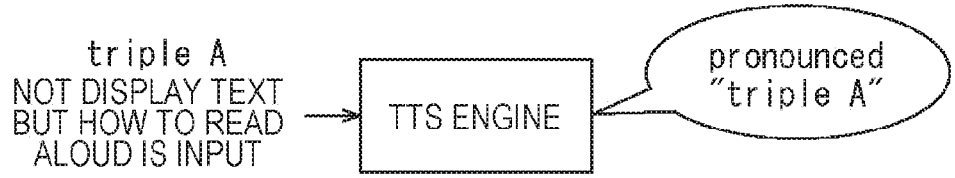
FIG. 5 is an explanatory diagram of an example in which text information is read aloud with a TTS engine to which the present technology is applied.

Specifically, as illustrated in FIG. 5, for example, when the text information is "AAA", the "triple A" indicating the pronunciation of the text information is provided as the text-to-speech utterance metadata to the TTS engine. This enables the TTS engine to read the text information aloud as "triple A" on the basis of the text-to-speech utterance metadata.

In other words, when the text information "AAA" is input, the TTS engine in FIG. 3 does not determine which pronunciation "triple A" or "AAA" is correct. On the other hand, the text-to-speech utterance metadata "triple A" is input to the TTS engine in FIG. 5, and the TTS engine can read the "triple A" aloud in accordance with the text-to-speech utterance metadata. Thus, the text-to-speech utterance as the producer intends is performed.

Figure 6:
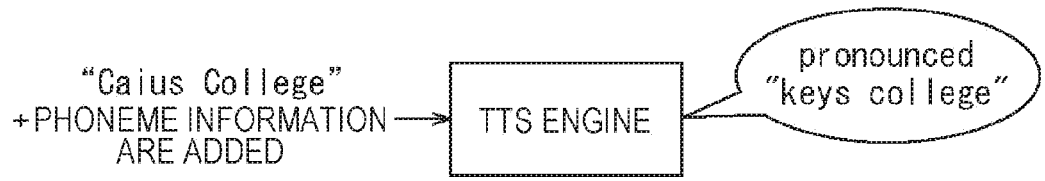
FIG. 6 is an explanatory diagram of an example in which text information is read aloud with a TTS engine to which the present technology is applied.

Alternatively, for example, when the text information is "Caius College", the phoneme information of the text information is provided as the text-to-speech utterance metadata to the TTS engine as illustrated in FIG. 6. This enables the TTS engine to read the text information aloud as "keys college" on the basis of the text-to-speech utterance metadata.

In other words, when the text information "Caius College" is input, the TTS engine in FIG. 4 does not determine how to pronounce the text information because the text information is a proper noun difficult to pronounce. On the other hand, the phoneme information is input as the text-to-speech utterance metadata to the TTS engine in FIG. 6, and the TTS engine can read the text information aloud as "keys college" in accordance with the text-to-speech utterance metadata. Thus, the text-to-speech utterance as the producer intends is performed.

Providing the text-to-speech utterance metadata to the TTS engine as described above allows for surely reading the text information aloud as the producer intends even when, for example, the pronunciation of the text information is not uniquely determined, or the text information is a proper noun difficult to pronounce. This enables people with visual disabilities to receive the information similar to the information able-bodied people receive.

<2. Configuration of System>

(Exemplary Configuration of Broadcasting System)

Figure 7:
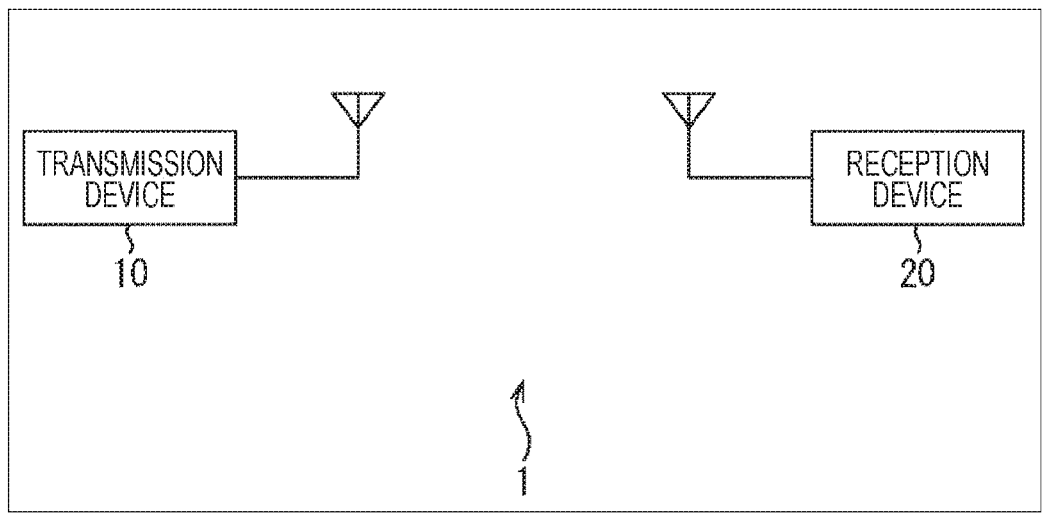
FIG. 7 is a diagram of an exemplary configuration of a broadcasting system to which the present technology is applied.

FIG. 7 is a diagram of an exemplary configuration of a broadcasting system to which the present technology is applied.

A broadcasting system 1 provides the content, for example, of a broadcast program, and can make the display information, for example, of a user interface accessible for people with visual disabilities. The broadcasting system 1 includes a transmission device 10 and a reception device 20.

The transmission device 10 is managed, for example, by a broadcast station that provides a terrestrial digital broadcasting service. The transmission device 10 transmits the content, for example, of a broadcast program with a digital broadcast signal. Furthermore, the transmission device 10 generates ESG information including text-to-speech utterance metadata and puts the ESG information in the digital broadcast signal and transmits the digital broadcast signal.

The reception device 20 includes, for example, a television receiver or a set-top box and is installed, for example, at the house of each user. The reception device 20 receives the digital broadcast signal transmitted from the transmission device 10, and outputs the video and voice of the content, for example, of a broadcast program.

Furthermore, the reception device 20 includes a TTS engine so as to read the display information, for example, of a user interface aloud on the basis of the text-to-speech utterance metadata included in the ESG information when the display information of the user interface is displayed.

This configuration causes the TTS engine to read the display information such as text information aloud in accordance with the text-to-speech utterance metadata. Thus, the display information is read aloud surely as the producer intends even when, for example, the pronunciation of the text information is not uniquely determined, or the text information is a proper noun difficult to pronounce.

Note that, the broadcasting system 1 in FIG. 7 includes a transmission device 10. However, a plurality of transmission devices 10 is installed at a plurality of broadcast stations, respectively. Similarly, the broadcasting system 1 in FIG. 7 includes a reception device 20. However, a plurality of reception devices 20 is installed at a plurality of houses of users, respectively.

(Exemplary Configuration of Transmission Device)

Figure 8:
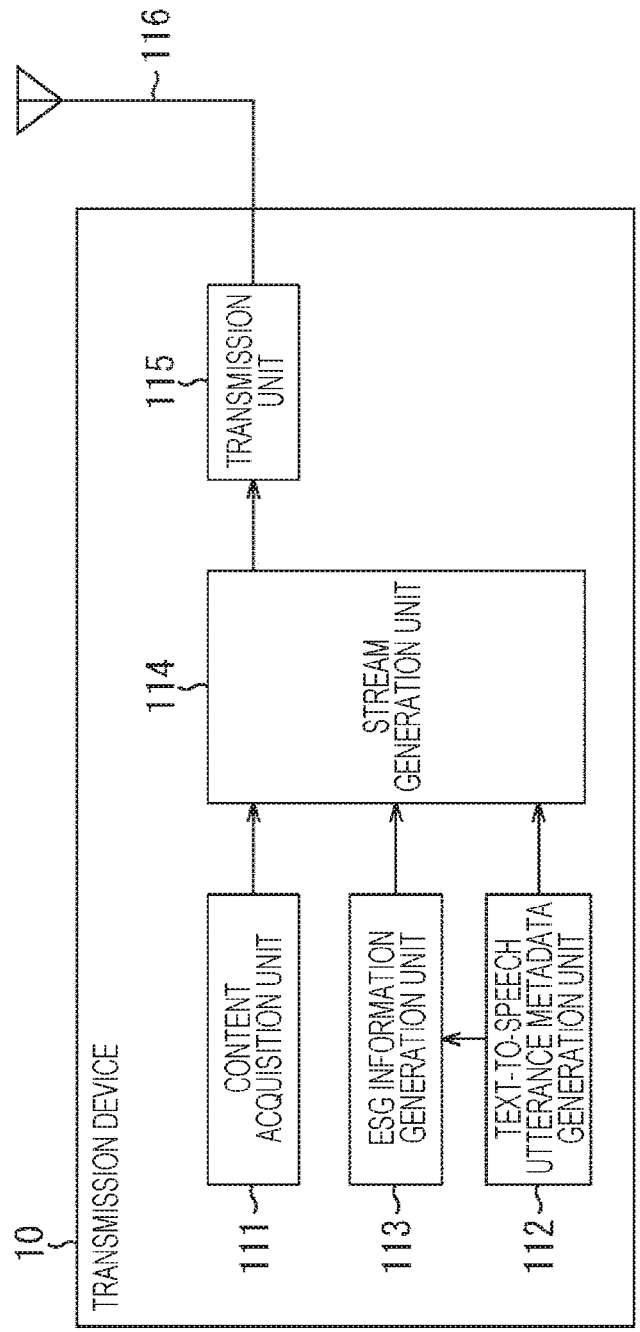
FIG. 8 is a diagram of an exemplary configuration of a transmission device to which the present technology is applied.

FIG. 8 is a diagram of an exemplary configuration of the transmission device of FIG. 7.

FIG. 8 illustrates that the transmission device 10 includes a content acquisition unit 111, a text-to-speech utterance metadata generation unit 112, an ESG information generation unit 113, a stream generation unit 114, and a transmission unit 115.

The content acquisition unit 111 acquires the content, for example, of a broadcast program and provides the content to the stream generation unit 114. Furthermore, the content acquisition unit 111 can process the contents, for example, in a process for encoding the content or a process for converting the format.

Note that the content is, for example, acquired from the storage of recorded contents in accordance with the broadcasting time of the contents, or acquired from the studio or a location of live broadcasting.

The text-to-speech utterance metadata generation unit 112 generates text-to-speech utterance metadata, for example, in response to the instructions from the producer of the user interface, and provides the text-to-speech utterance metadata to the ESG information generation unit 113. Note that, for example, the information indicating the pronunciation of the text information when the pronunciation is not uniquely determined, or the phoneme information when the text information is a proper noun difficult to pronounce is generated as the text-to-speech utterance metadata.

In this example, there are two types of text-to-speech utterance metadata stored in the ESG information. One is the data describing the address information to acquire the text-to-speech utterance metadata, and the other is the data describing the content of the text-to-speech utterance metadata. When the address information is described in the text-to-speech utterance metadata, the content of the text-to-speech utterance metadata is described in a file acquired in accordance with the address information (hereinafter, referred to as a "text-to-speech utterance metadata file").

In other words, when the text-to-speech utterance metadata generation unit 112 generates the text-to-speech utterance metadata including the address information and provides the text-to-speech utterance metadata to the ESG information generation unit 113, the text-to-speech utterance metadata generation unit 112 generates a text-to-speech utterance metadata file to be acquired in accordance with the address information and provides the text-to-speech utterance metadata file to the stream generation unit 114. On the other hand, when the text-to-speech utterance metadata includes the content of the text-to-speech utterance metadata, the text-to-speech utterance metadata generation unit 112 does not need to generate a text-to-speech utterance metadata file, and thus only provides the text-to-speech utterance metadata to the ESG information generation unit 113.

The ESG information generation unit 113 generates ESG information as channel information for selecting the station of the content, for example, of a broadcast program. Furthermore, the ESG information generation unit 113 stores (places) the text-to-speech utterance metadata provided from the text-to-speech utterance metadata generation unit 112 in the ESG information. The ESG information generation unit 113 provides the ESG information including the text-to-speech utterance metadata to the stream generation unit 114.

The stream generation unit 114 generates a stream in compliance with a predetermined standard on the basis of the content data provided from the content acquisition unit 111 and the ESG information provided from the ESG information generation unit 113, and provides the stream to the transmission unit 115.

Alternatively, when the text-to-speech utterance metadata included in the ESG information provided from the ESG information generation unit 113 includes the address information, the text-to-speech utterance metadata file is provided to the stream generation unit 114 from the text-to-speech utterance metadata generation unit 112. In this case, the stream generation unit 114 generates a stream in compliance with a predetermined standard on the basis of the content data provided from the content acquisition unit 111, the text-to-speech utterance metadata file provided from the text-to-speech utterance metadata generation unit 112, and the ESG information provided from the ESG information generation unit 113.

The transmission unit 115 processes the stream provided from the stream generation unit 114, for example, in a digital modulation process, and transmits the stream as a digital broadcast signal through an antenna 116.

Note that all of the functional blocks in the transmission device 10 of FIG. 8 are not necessarily arranged in a device. At least some of the functional blocks can be arranged as a device independent from the other functional blocks. For example, the text-to-speech utterance metadata generation unit 112 or the ESG information generation unit 113 can be provided as a function of a server on the Internet. In the example, the transmission device 10 acquires and processes the text-to-speech utterance metadata or ESG information provided from the server.

(Exemplary Configuration of Reception Device)

Figure 9:
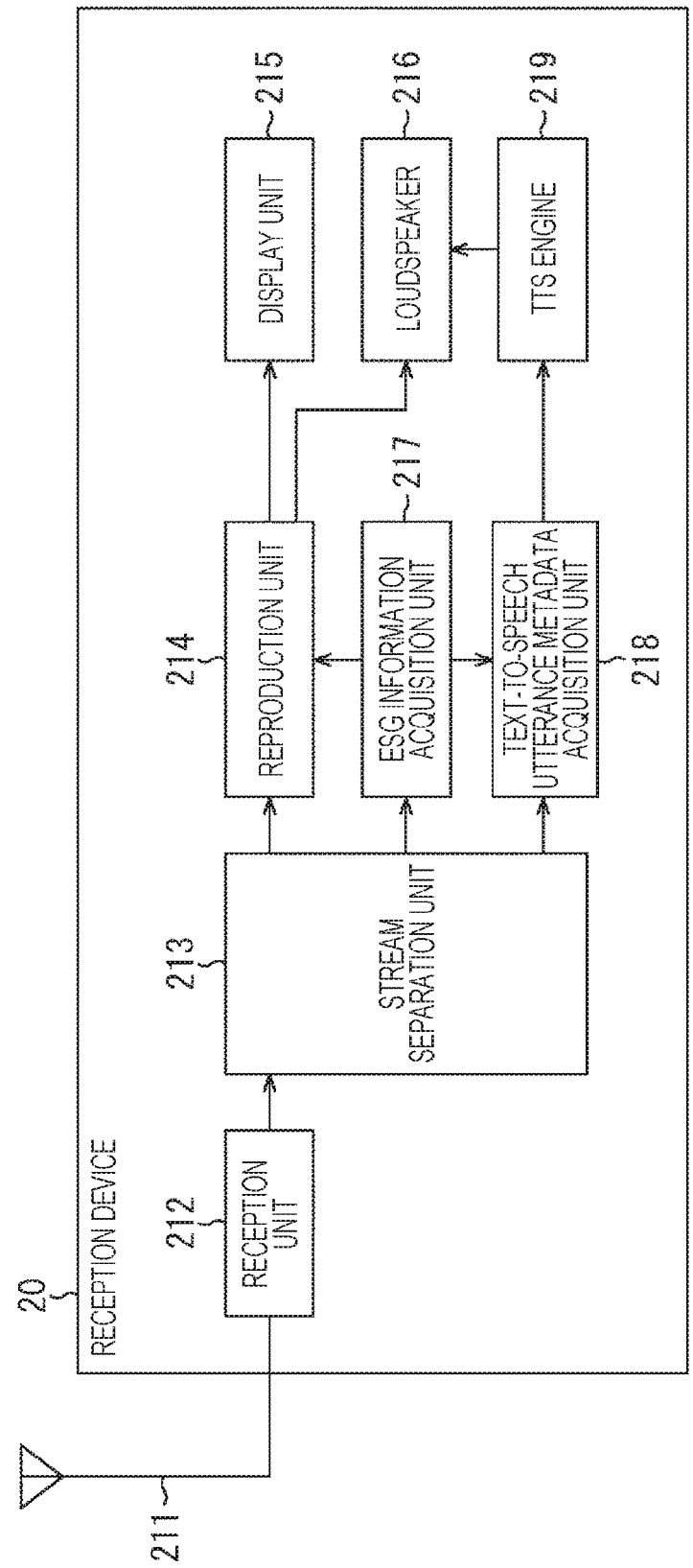
FIG. 9 is a diagram of an exemplary configuration of a reception device to which the present technology is applied.

FIG. 9 is a diagram of an exemplary configuration of the reception device of FIG. 7.

FIG. 9 illustrates that the reception device 20 includes a reception unit 212, a stream separation unit 213, a reproduction unit 214, a display unit 215, a loudspeaker 216, an ESG information acquisition unit 217, a text-to-speech utterance metadata acquisition unit 218, and a TTS engine 219.

The reception unit 212 processes the digital broadcast signal received with the antenna 211, for example, in a decoding process, and provides the stream generated by the process to the stream separation unit 213.

The stream separation unit 213 separates the content data and the ESG information from the stream provided from the reception unit 212, and provides the content data to the reproduction unit 214, and the ESG information to the ESG information acquisition unit 217.

The reproduction unit 214 displays the picture of the content on the display unit 215 on the basis of the content data provided from the stream separation unit 213, and outputs the voice of the content from the loudspeaker 216. This reproduces the content, for example, of a broadcast program.

The ESG information acquisition unit 217 acquires the ESG information provided from the stream separation unit 213. For example, when the user instructs the reception device 20 to display an ESG screen, the ESG information acquisition unit 217 provides the ESG information to the reproduction unit 214. The reproduction unit 214 generates an ESG screen on the basis of the ESG information provided from the ESG information acquisition unit 217, and displays the ESG screen on the display unit 215.

Furthermore, the ESG information acquisition unit 217 provides the text-to-speech utterance metadata included in the ESG information to the text-to-speech utterance metadata acquisition unit 218. The text-to-speech utterance metadata acquisition unit 218 acquires the text-to-speech utterance metadata provided from the ESG information acquisition unit 217.

There are two types of text-to-speech utterance metadata, the data describing the address information to acquire the text-to-speech utterance metadata, and the data describing the content of the text-to-speech utterance metadata in this example as described above.

In other words, when the text-to-speech utterance metadata includes the address information, the text-to-speech utterance metadata acquisition unit 218 acquires the text-to-speech utterance metadata file from the stream separated by the stream separation unit 213 on the basis of the included address information, and provides the text-to-speech utterance metadata including the content provided from the acquired text-to-speech utterance metadata file to the TTS engine 219. On the other hand, when the text-to-speech utterance metadata includes the content, the text-to-speech utterance metadata acquisition unit 218 provides the text-to-speech utterance metadata without any process to the TTS engine 219.

The TTS engine 219 reads the display information, for example, of a user interface aloud on the basis of the text-to-speech utterance metadata provided from the text-to-speech utterance metadata acquisition unit 218, and outputs the voice from the loudspeaker 216.

For example, an ESG screen is displayed on the display unit 215, and a title or program information is to be read aloud so that the text information is accessible for people with visual disabilities. However, the pronunciation of the text information is not uniquely determined. In such an example, the TTS engine 219 enables the text information to be read aloud as the producer intends in accordance with the text-to-speech utterance metadata. This enables people with visual disabilities to receive the information similar to the information that the able-bodied people receive.

Note that FIG. 9 illustrates that the display unit 215 and the loudspeaker 216 are internally provided in the reception device 20. However, the display unit 215 and the loudspeaker 216 can be provided as another external device.

<3. Arrangement of Text-to-Speech Utterance Metadata with Extension of ESG>

Next, the ESG information in which text-to-speech utterance metadata is stored will be described in detail. Note that the specifications of the Electronic Service Guide (ESG) are designed by Open Mobile Alliance (OMA) that is an organization for designing the standards of mobile phones. The ESG information in which the text-to-speech utterance metadata is stored is also in compliance with the ESG prescribed in the OMA-Mobile Broadcast Services Enabler Suite (OMA-BCAST).

(Configuration of ESG)

Figure 10:
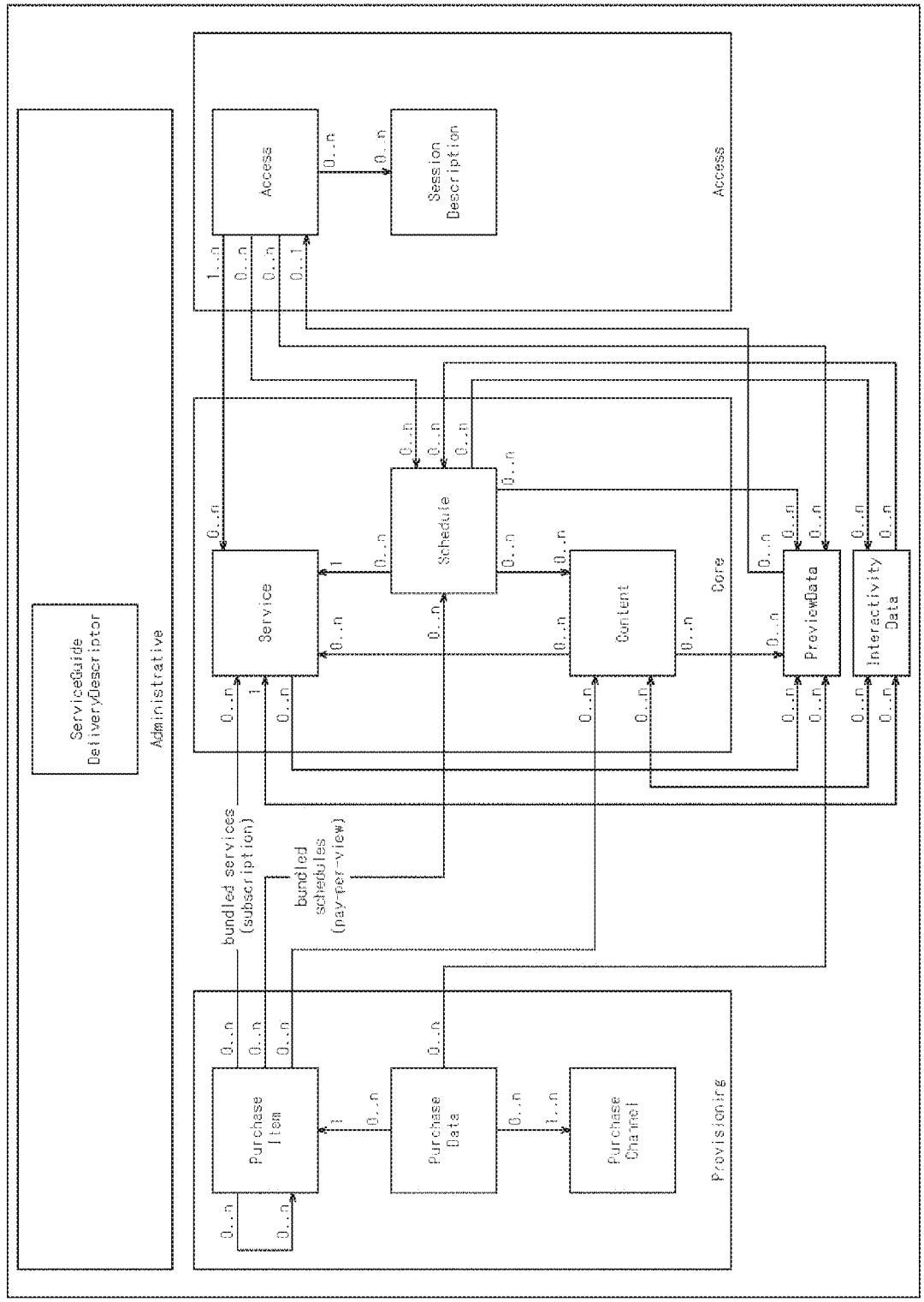
FIG. 10 is a diagram of an exemplary configuration of ESG.

FIG. 10 is a diagram of an exemplary configuration of ESG. Note that each of the lines connecting fragments in FIG. 10 shows the cross-reference between the connected fragments.

FIG. 10 illustrates that the ESG includes fragments having different purposes, and is divided into four groups of Administrative, Provisioning, Core, and Access in accordance with the purpose of the fragment.

The Administrative is a group that provides basic information for receiving the ESG information. The group of Administrative includes a "ServiceGuideDeliveryDescriptor". The "ServiceGuideDeliveryDescriptor" provides the information about the channel on which a plurality of service guide fragments can be received, the scheduling information about the channel, and the update information to the reception device 20. This enables the reception device 20 to receive only necessary ESG information at a proper time.

The Provisioning is a group that provides the fee information about the service reception. The group of Provisioning includes a Purchase Item, Purchase Data, and a Purchase Channel. The Purchase Item provides the fee information about a service or a bundle of services. The Purchase Data provides the information indicating which way the user can pay the fee through. The Purchase Channel provides the information about the system in which the user can actually purchase a service.

Note that the text-to-speech utterance metadata or the address information indicating the address at which the text-to-speech utterance metadata is acquired can be stored in the fragment of each of the Purchase Item, the Purchase Data, and the Purchase Channel. A method of storing the text-to-speech utterance metadata in the fragment of each of the Purchase Item, the Purchase Data, and the Purchase Channel will be described below with reference to FIG. 13.

The Core is a group that provides the information about a service. The group of Core includes Service, Schedule, and Content. The service provides metadata including the content of a channel service and the control information related to the content of the channel service. The Schedule provides the metadata including the schedule of the delivery of the content, and the control information related to the schedule of the delivery of the content. The Content provides the metadata including the content of the service and the control information related to the content of the service.

Note that the text-to-speech utterance metadata or the address information indicating the address at which the text-to-speech utterance metadata is acquired can be stored in each fragment of the Service and the Content. FIG. 11 illustrates an exemplary configuration of the Service Fragment. FIG. 12 illustrates an exemplary configuration of the Content Fragment. A method for storing the text-to-speech utterance metadata in each fragment of the Service and the Content will be described below with reference to FIG. 13.

The Access is a group that provides the service access information indicating a method for receiving the service of the group of Core and the specific information about the session in which the content of the service is transmitted. The Access enables the reception device 20 to access a service. The group of Access includes Access, and Session Description.

The Access in the group of Access provides a method for enabling the reception device 20 to access some additional services on the basis of a service by providing a plurality of methods for accessing the service. The Session Description provides the session information about the service transmitted in the service access defined by an Access Fragment.

In addition to the four groups, the ESG includes Preview Data, and Interactivity Data. The Preview Data provides a preview or an icon for a service and a content. The Interactivity Data provides the metadata about the application of the service and the content.

Note that the text-to-speech utterance metadata or the address information indicating the address at which the text-to-speech utterance metadata is acquired can be stored in the Preview Data Fragment. A method for storing the text-to-speech utterance metadata in the Preview Data Fragment will be described below with reference to FIG. 14.

(Exemplary Configuration of Extended ESG)

FIG. 13 is a diagram of an exemplary configuration of ESG extended in order to store the text-to-speech utterance metadata or the address information indicating the address at which the text-to-speech utterance metadata is acquired. Note that FIG. 13 illustrates that the Service Fragment, the Content Fragment, the Purchase Item Fragment, the Purchase Data Fragment, and the Purchase Channel are extended among the fragments included in the ESG.

In other words, the extended fragments include a Name element and a Description element. Thus, each of the fragment is extended so that a PhoneticInfoURI element or a PhoneticInfo element is added to the Name element and the Description element. Note that the PhoneticInfoURI element or the PhoneticInfo element can be added to the PrivateExt element of the extended fragment.

FIG. 13 illustrates that the name of a content fragment is designated in the Name element. The Name element includes the PhoneticInfoURIelement, the PhoneticInfoelement, and a Type attribute as the child elements.

The address information for acquiring the text-to-speech utterance metadata is designated in the PhoneticInfoURI element. The Type attribute is used together with the PhoneticInfoURI element as a pair. The type information indicating the type of text-to-speech utterance metadata is designated in the Type attribute.

For example, a Uniform Resource Identifier (URI) is designated as the address information. Alternatively, for example, when a text-to-speech utterance metadata file is transmitted in a File Delivery over Unidirectional Transport (FLUTE) session, the address information for acquiring the text-to-speech utterance metadata file transmitted in the FLUTE session is designated. Note that the text-to-speech utterance metadata can be described in Speech Synthesis Markup Language (SSML) that is a voice synthesis markup language.

The content of the text-to-speech utterance metadata is described in the PhoneticInfo element. For example, the content of the text-to-speech utterance metadata is described in SSML. The Type attribute is used together with the PhoneticInfo element as a pair. The type information indicating the type of text-to-speech utterance metadata is designated in the Type attribute.

Note that, when "1 . . . N" is designated as the number of occurrence (Cardinality) in FIG. 13, the element or attribute is designated once or more. When "0 . . . N" is designated as the number of occurrence (Cardinality), it is arbitrarily determined whether the element or attribute is designated once or more. Alternatively, when "0 . . . 1" is designated as the number of occurrence (Cardinality), it is arbitrarily determined whether the element or attribute is designated.

Accordingly, the PhoneticInfoURI element, the PhoneticInfo element, and the Type attribute that are the child elements of the Name element are optional elements or attribute. Thus, not only either of the PhoneticInfoURI element or the PhoneticInfo element is placed but also both of the PhoneticInfoURI element and the PhoneticInfo element can be placed.

Furthermore, the Description element in FIG. 13 includes a PhoneticInfoURI element, a PhoneticInfo element, and a Type attribute as the child elements. In other words, the child elements of the Description element are similar to the child elements of the Name element.

Specifically, the address information for acquiring the text-to-speech utterance metadata is designated in the PhoneticInfoURI element. The Type attribute is used together with the PhoneticInfoURI element as a pair. The type information indicating the type of text-to-speech utterance metadata is designated in the Type attribute. Furthermore, the content of the text-to-speech utterance metadata is described in the PhoneticInfo element. The Type attribute is used together with the PhoneticInfo element as a pair. The type information indicating the type of text-to-speech utterance metadata is designated in the Type attribute.

Note that, as for the PhoneticInfoURI element and the PhoneticInfo element that are the child elements of the Description element, either of the PhoneticInfoURI element or the PhoneticInfo element can be placed, or both of the PhoneticInfoURI element and the PhoneticInfo element can be placed.

FIG. 14 is a diagram of another configuration of ESG extended in order to store the text-to-speech utterance metadata or the address information indicating the address at which the text-to-speech utterance metadata is acquired. Note that FIG. 14 illustrates that the Preview Data Fragment is extended among the fragments included in the ESG.

In other words, the Preview Data Fragment includes a Picture element, and thus the Preview Data Fragment is extended so that a PhoneticInfoURI element or a PhoneticInfo element is added to the relativePreference attribute of the Picture element. Note that the PhoneticInfoURI element or the PhoneticInfo element can be added to the PrivateExt element of the Preview Data Fragment.

FIG. 14 illustrates that a preview or an icon for a service and a content is defined in the Picture element. The Picture element includes a PhoneticInfoURI element, a PhoneticInfo element, and a Type attribute as the child elements. In other words, the child elements of the Picture element are similar to the child elements of the Name element and the child elements Description element described above.

Specifically, the address information for acquiring the text-to-speech utterance metadata is designated in the PhoneticInfoURI element. The Type attribute is used together with the PhoneticInfoURI element as a pair. The type information indicating the type of text-to-speech utterance metadata is designated in the Type attribute. Furthermore, the content of the text-to-speech utterance metadata is described in the PhoneticInfo element. The Type attribute is used together with the PhoneticInfo element as a pair. The type information indicating the type of text-to-speech utterance metadata is designated in the Type attribute.

Note that, as for the PhoneticInfoURI element and the PhoneticInfo element that are the child elements of the Picture element, either of the PhoneticInfoURI element or the PhoneticInfo element can be placed, or both of the PhoneticInfoURI element and the PhoneticInfo element can be placed.

(Exemplary Configuration of PhoneticInfoURI Element)

Figure 15:
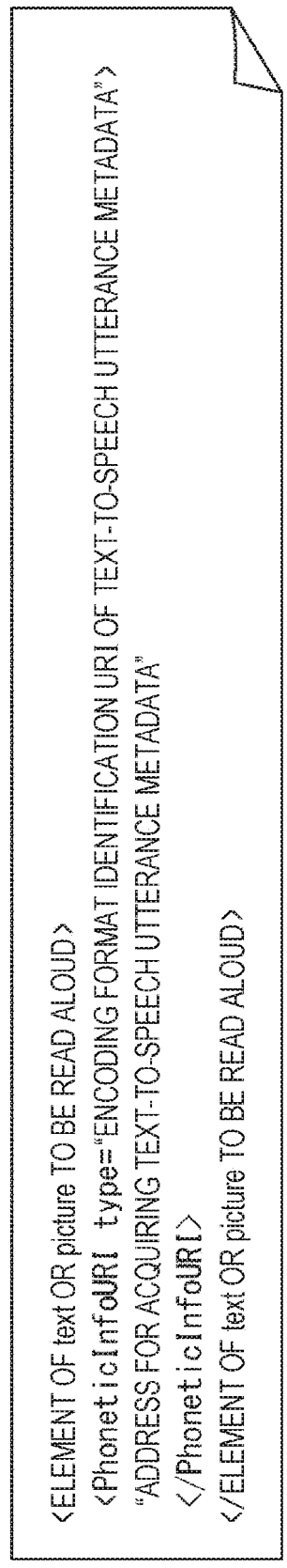
FIG. 15 is a diagram of the detailed configuration of a PhoneticInfoURI element.

FIG. 15 is a diagram of the detailed configuration of a PhoneticInfoURI element in extended ESG.

The PhoneticInfoURI element of FIG. 15 is described as the child element of the Name element or Description element, for example, of a Service Fragment, or as the child element of the picture element of a Preview Data Fragment. The address information for acquiring the text-to-speech utterance metadata is designated in the PhoneticInfoURI element.

Furthermore, an identification URI of the encoding format of the text-to-speech utterance metadata is designated as the type attribute of the PhoneticInfoURI element.

For example, a text-to-speech utterance metadata file is transmitted in the FLUTE session, and thus the address information for acquiring the text-to-speech utterance metadata file transmitted in the FLUTE session is designated in the PhoneticInfoURI element.

(Exemplary Configuration of PhoneticInfo Element)

Figure 16:
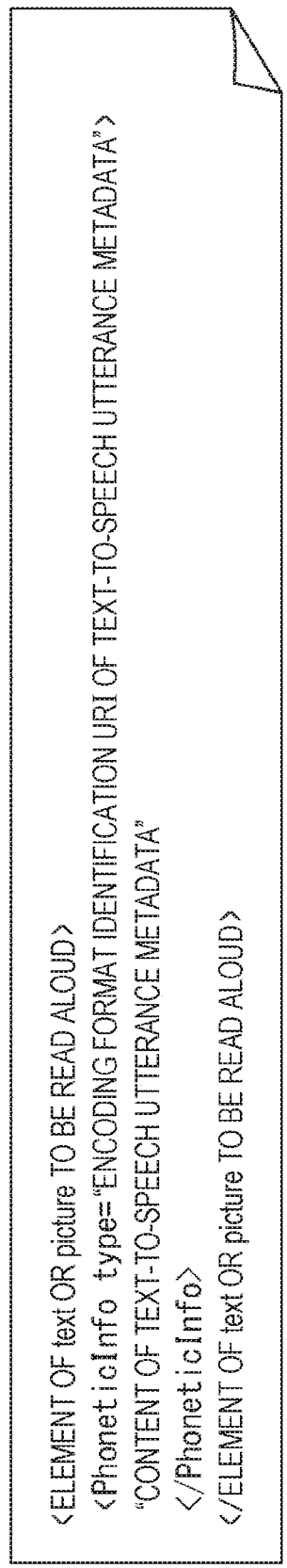
FIG. 16 is a diagram of the detailed configuration of a PhoneticInfo element.

FIG. 16 is a diagram of the detailed configuration of the PhoneticInfo element in extended ESG.

FIG. 16 illustrates that the PhoneticInfo element is described as the child element of the Name element or Description element, for example, of a Service Fragment, or as the child element of the picture element of a Preview Data Fragment. The content of the text-to-speech utterance metadata is described in the PhoneticInfo element.

Furthermore, an identification URI of the encoding format of the text-to-speech utterance metadata is designated as the type attribute of the PhoneticInfo element.

For example, the content of the text-to-speech utterance metadata is described in SSML that is a speech synthesis markup language, and stored as the text information between the start tag and end tag of the PhoneticInfo element.

Note that, at least one of the PhoneticInfoURI element and the PhoneticInfo element is described in the extended fragment in the ESG. Additionally, the text-to-speech utterance metadata is designated by the PhoneticInfoURI element or the PhoneticInfo element, and thus sometimes referred to as a "PhoneticInfo object".

<4. Exemplary Description of Text-to-Speech Utterance Metadata>

As described above, the text-to-speech utterance metadata can be described, for example, in SSML that is a speech synthesis markup language. The SSML is recommended by World Wide Web Consortium (W3C) with the aim of enabling usage of a higher-quality speech synthesizing function. Using SSML allows for close and appropriate control of the elements necessary for speech synthesis, such as pronunciation, volume, and rhythm. Hereinafter, exemplary description of a document in the SSML format will be described with reference to FIGS. 17 to 19.

(Sub Element)

Figure 17:
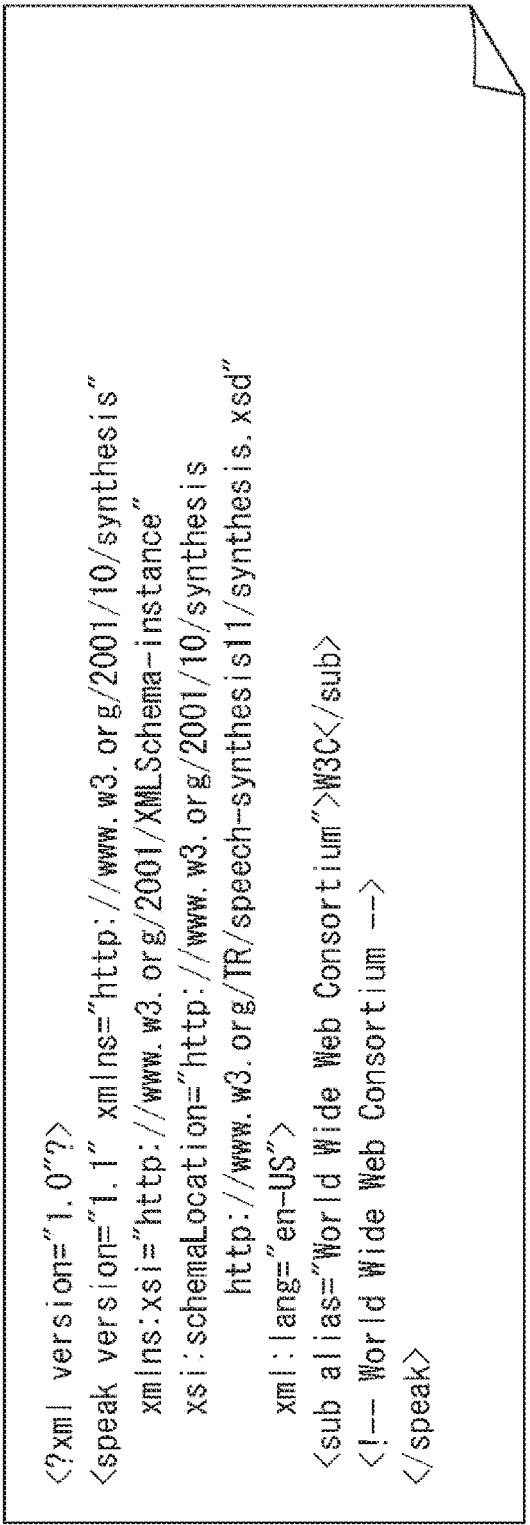
FIG. 17 is a diagram of an exemplary description of a sub element in an SSML format.

FIG. 17 is a diagram of exemplary description of a sub element in the SSML format.

The sub element is used to replace text information with another text information. The text information for text-to-speech utterance is designated in an alias attribute. For example, in FIG. 17, the text information "W3C" is replaced with the text information "World Wide Web Consortium" for text-to-speech utterance and read aloud.

Using the sub element allows for designation of the information indicating the pronunciation of text information, for example, when the pronunciation of the text information is not uniquely determined.

(Phoneme Element)

FIG. 18 is a diagram of exemplary description of a phoneme element in the SSML format.

The phoneme element is used to give the pronunciation transcribed by phonemes/phonetic alphabet to the described text information. An alphabet attribute and a ph attribute can be designated in the phoneme element. The phonetic characters of phonemes/phonetic alphabet are designated in the alphabet attribute. The character string of phonemes/phonemes/phonetic alphabet is designated in the ph attribute. For example, in FIG. 18, the pronunciation of the text information "La vita e bella" is designated in the ph attribute. Note that the "ipa" designated in the alphabet attribute indicates that the phonetic characters correspond to the reading symbols of International Phonetic Alphabet (IPA).

Using the phoneme element allows for designation, for example, of the phoneme information of text information, for example, when the text information is a proper noun difficult to pronounce.

(Audio Element)

FIG. 19 is a diagram of exemplary description of an audio element in the SSML format.

The audio element is used to output the embedded speech or synthesized speech of an audio file. A src attribute can be designated in the audio element. The Uniform Resource Identifier (URI) of the audio file is designated in the src attribute. For example, in FIG. 19, the text information "What city do you want to fly from?" is read aloud by the reproduction of the audio file "prompt.au" designated in the src attribute.

Using the audio element allows for the reproduction, for example, of a recorded audio file, and thus allows for provision of the speech information as the producer of the user interface intends to people with visual disabilities.

Note that the sub element, phoneme element, and audio element described above are examples of description of text-to-speech utterance metadata in the SSML format. Another element or attribute in the SSML format can be used for the description. Alternatively, the text-to-speech utterance metadata can be described, for example, in another markup language other than the SSML format.

<5. Flow of Process Performed in Each Device>

Next, the processes performed in the transmission device 10 and reception device 20 included in the broadcasting system 1 of FIG. 7 will be described.

(Transmitting Process)

Figure 20:
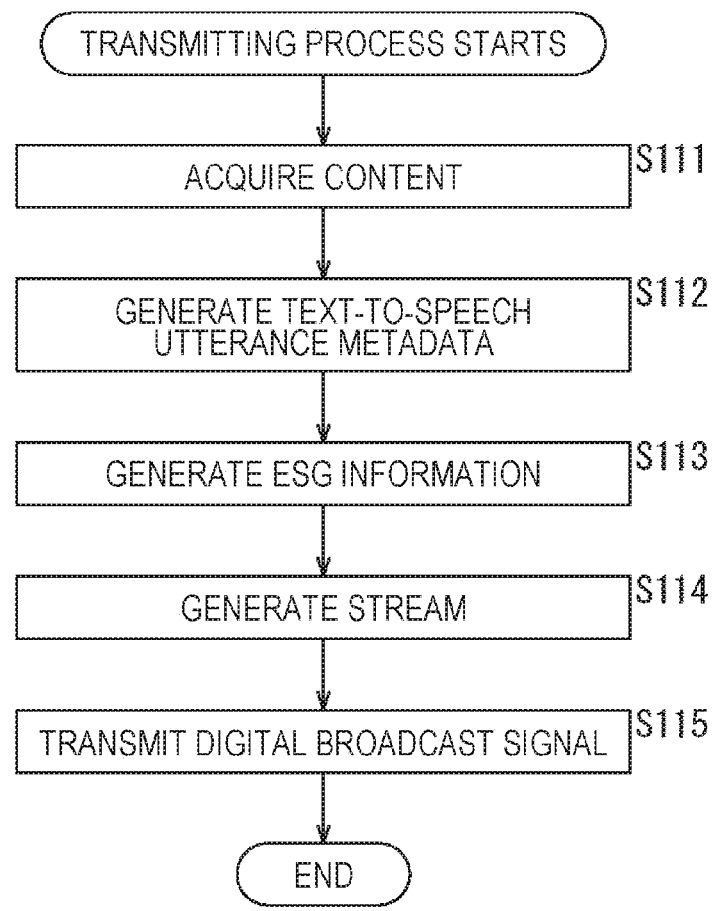
FIG. 20 is an explanatory flowchart of a transmitting process.

First, the flow of a transmitting process that the transmission device 10 of FIG. 7 performs will be described with reference to the flowchart of FIG. 20.

In step S111, the content acquisition unit 111 acquires the content, for example, of a broadcast program and provides the content to the stream generation unit 114.

In step S112, the text-to-speech utterance metadata generation unit 112 generates text-to-speech utterance metadata, for example, in response to the instructions from the producer of the user interface, and provides the text-to-speech utterance metadata to the ESG information generation unit 113.

Note that when the text-to-speech utterance metadata generation unit 112 generates text-to-speech utterance metadata including address information and provides the text-to-speech utterance metadata to the ESG information generation unit 113, the text-to-speech utterance metadata generation unit 112 generates a text-to-speech utterance metadata file to be acquired in accordance with the address information, and provides the text-to-speech utterance metadata file to the stream generation unit 114.

In step S113, the ESG information generation unit 113 generates ESG information on the basis of the text-to-speech utterance metadata provided from the text-to-speech utterance metadata generation unit 112, and provides the ESG information to the stream generation unit 114.

In step S114, the stream generation unit 114 generates a stream in compliance with a predetermined standard on the basis of the content data provided from the content acquisition unit 111 and the ESG information provided from the ESG information generation unit 113, and provides the stream to the transmission unit 115.

Note that, when the text-to-speech utterance metadata included in the ESG information provided from the ESG information generation unit 113 includes the address information, the stream generation unit 114 generates a stream in compliance with a predetermined standard on the basis of the text-to-speech utterance metadata file provided from the text-to-speech utterance metadata generation unit 112 in addition to the content data and the ESG information, and provides the stream to the transmission unit 115.

In step S115, the transmission unit 115 processes the stream provided from the stream generation unit 114, for example, in a digital modulation process, and transmits the stream as a digital broadcast signal through the antenna 116.

The transmitting process has been described above. In the transmitting process, the text-to-speech utterance metadata about the text-to-speech utterance of the display information, for example, of a user interface as the producer intends is generated, and the ESG information including the text-to-speech utterance metadata is generated. Then, the ESG information including the text-to-speech utterance metadata is transmitted together with the content.

This process enables the TTS engine 219 on the reception device 20 to read the display information aloud on the basis of the text-to-speech utterance metadata. Thus, for example, even when the pronunciation of the text information is not uniquely determined, or the text information is a proper noun difficult to pronounce, the text information is surely read aloud as the producer intends. As a result, people with visual disabilities can receive the information similar to the information that able-bodied people receive.

(Receiving Process)

Figure 21:
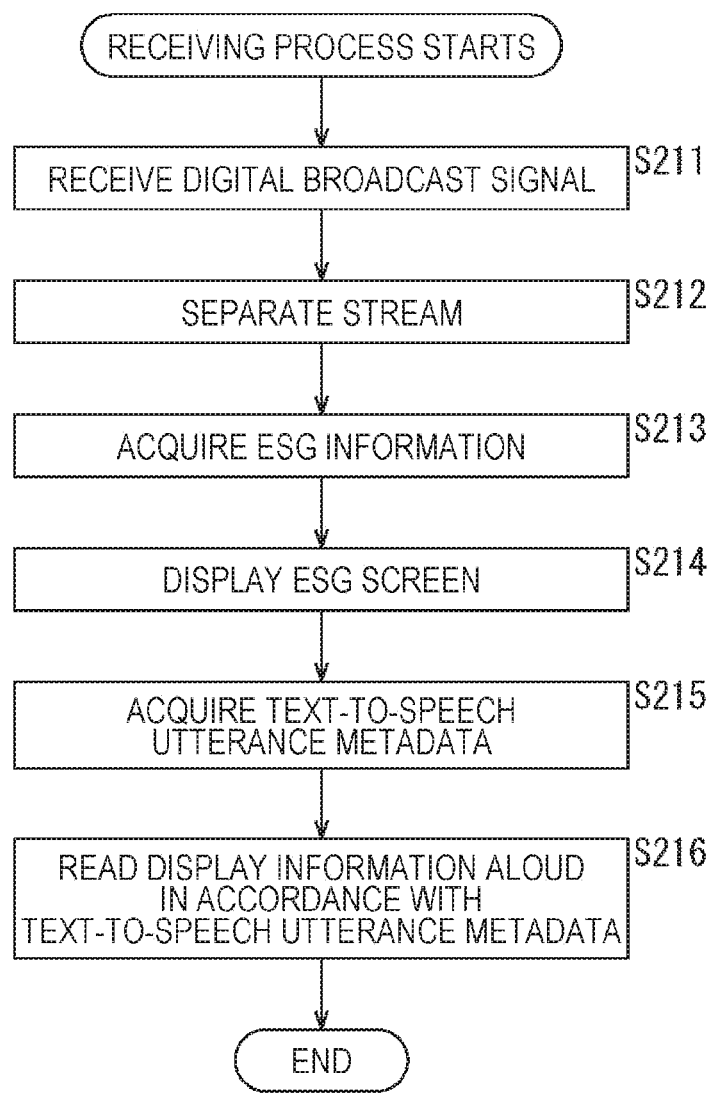
FIG. 21 is an explanatory flowchart of a receiving process.

Next, the flow of a receiving process that the reception device 20 of FIG. 7 performs will be described with reference to the flowchart of FIG. 21.

In step S211, the reception unit 212 receives the digital broadcast signal transmitted through an antenna 211 from the transmission device 10. Furthermore, the reception unit 212 processes the digital broadcast signal, for example, in a demodulation process, and provides the stream generated by the process to the stream separation unit 213.

In step S212, the stream separation unit 213 separates the content data and the ESG information from the stream provided from the reception unit 212, and provides the content data to the reproduction unit 214, and the ESG information to the ESG information acquisition unit 217.

In step S213, the ESG information acquisition unit 217 acquires the ESG information provided from the stream separation unit 213. For example, when the user instructs the reception device 20 to display an ESG screen, the ESG information acquisition unit 217 provides the ESG information to the reproduction unit 214. Furthermore, the ESG information acquisition unit 217 provides the text-to-speech utterance metadata included in the ESG information to the text-to-speech utterance metadata acquisition unit 218.

In step S214, the reproduction unit 214 generates an ESG screen on the basis of the ESG information provided from the ESG information acquisition unit 217, and displays the ESG screen on the display unit 215.

In step S215, the text-to-speech utterance metadata acquisition unit 218 acquires the text-to-speech utterance metadata provided from the ESG information acquisition unit 217.

When the text-to-speech utterance metadata includes the address information in this step, the text-to-speech utterance metadata acquisition unit 218 acquires the text-to-speech utterance metadata file from the stream separated by the stream separation unit 213 on the basis of the address information, and provides the text-to-speech utterance metadata including the content provided from the acquired text-to-speech utterance metadata file to the TTS engine 219. On the other hand, when the text-to-speech utterance metadata includes the content, the text-to-speech utterance metadata acquisition unit 218 provides the text-to-speech utterance metadata without any process to the TTS engine 219.

In step S216, the TTS engine 219 reads the display information, for example, of a user interface aloud on the basis of the text-to-speech utterance metadata provided from the text-to-speech utterance metadata acquisition unit 218, and outputs the sound of the display information from the loudspeaker 216.

In this example, when an ESG screen is displayed on the display unit 215 and a title or program information is to be read aloud in order to make the ESG screen accessible for people with visual disabilities, but, for example, the pronunciation of the text information is not uniquely determined in the process of step S214, the TTS engine 219 follows the text-to-speech utterance metadata to read the text information aloud as the producer intends.

The receiving process has been described above. In the receiving process, the ESG information, which includes the text-to-speech utterance metadata about the text-to-speech utterance of the display information as the producer intends and is transmitted from the transmission device 10, is received. Subsequently, the text-to-speech utterance metadata included in the ESG information is acquired. Then, the display information, for example, of a user interface is read aloud on the basis of the text-to-speech utterance metadata.

This process enables the TTS engine 219 to read the display information aloud on the basis of the text-to-speech utterance metadata. Thus, for example, when the pronunciation of the text information is not uniquely determined, or the text information is a proper noun difficult to pronounce, the text information is surely read aloud as the producer intends. As a result, people with visual disabilities can receive the information similar to the information that able-bodied people receive.

<6. Exemplary Variation>

When the text-to-speech utterance metadata includes the address information, the text-to-speech utterance metadata file transmitted in the FLUTE session is acquired in accordance with the address information in the embodiment described above. However, the text-to-speech utterance metadata file can be delivered from a server on the Internet. In such a case, for example, the Uniform Resource Locator (URL) of the server is designated as the address information.

The ESG prescribed in OMA-BCAST has been described as the electronic program information in the embodiment described above. The present technology can be applied, for example, to Electronic Program Guide (EPG) or another electronic program information. Furthermore, the electronic program information such as ESG information can be delivered from a server on the Internet and received by the reception device 20.

<7. Configuration of Computer>

Figure 22:
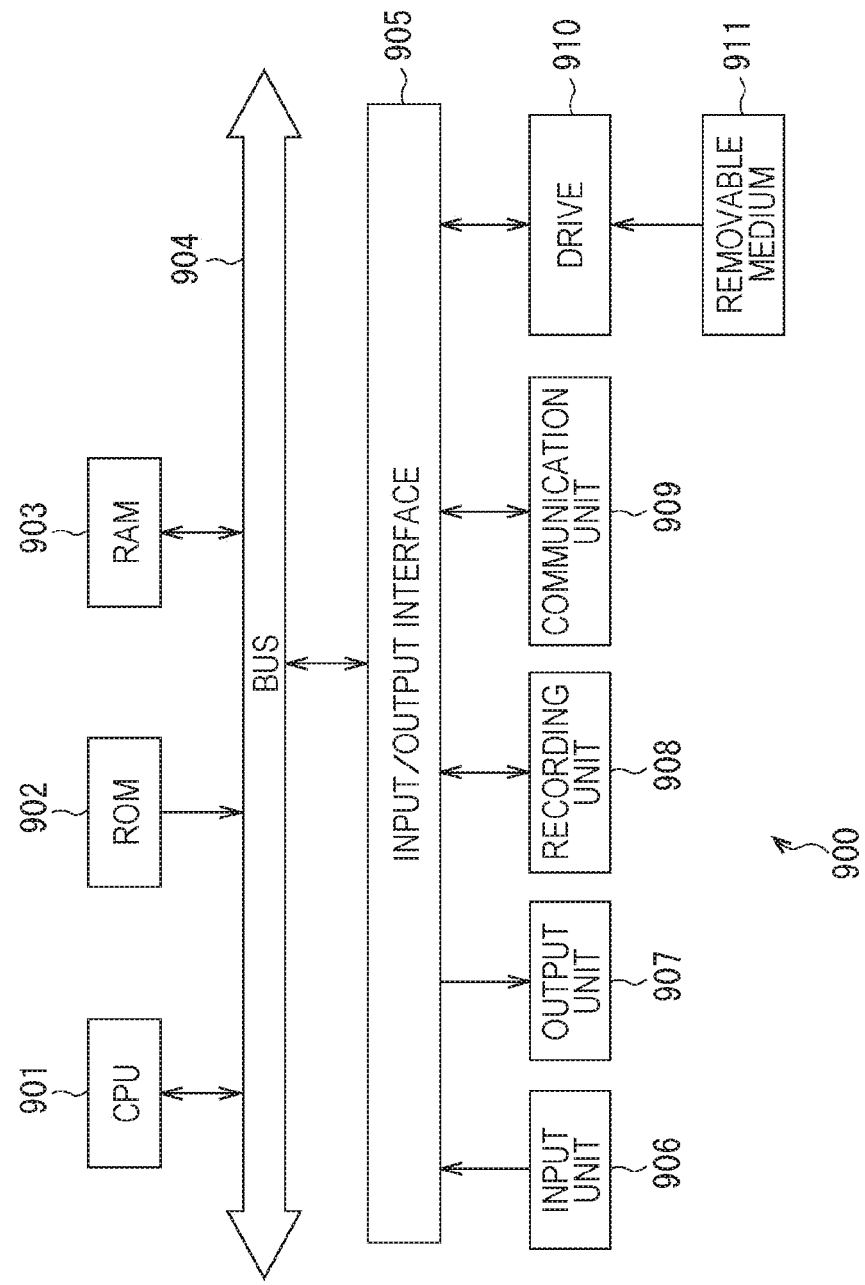
FIG. 22 is a diagram of an exemplary configuration of a computer.

The series of processes described above can be performed either with hardware or with software. When the series of processes is performed with software, the program of the software is installed on the computer. FIG. 22 is a diagram of exemplary configuration of the hardware of the computer that performs the series of processes with a program.

In a computer 900, a Central Processing Unit (CPU) 901, a Read OnlyMemory (ROM) 902, and a RandomAccess Memory (RAM) 903 are connected to each other via a bus 904. An input/output interface 905 is further connected to the bus 904. An input unit 906, an output unit 907, a recording unit 908, a communication unit 909, and a drive 910 are connected to the input/output interface 905.

The input unit 906 includes, for example, a keyboard, a mouse, and a microphone. The output unit 907 includes, for example, a display, and a loudspeaker. The recording unit 908 includes, for example, a hard disk or a non-volatile memory. The communication unit 909 includes, for example, a network interface. The drive 910 drives a removable medium 911 such as a magnetic disk, an optical disk, a magneto-optical disk, or a semiconductor memory.

In the computer 900 having the configuration described above, the CPU 901 loads the program stored in the ROM 902 or the recording unit 908 via the input/output interface 905 and the bus 904 onto the RAM 903 and executes the program. This execution implements the series of processes.

The program executed by the computer 900 (CPU 901) can be recorded in the removable medium 911, for example, as a package medium and provided. Alternatively, the program can be provided through a wired or wireless transmission medium such as a local area network, the Internet, or digital satellite broadcasting.

The computer 900 can install a program via the input/output interface 905 onto the recording unit 908 by attaching the removable medium 911 to the drive 910. Alternatively, the program can be received in the communication unit 909 via a wired or wireless transmission medium, and installed on the recording unit 908. Alternatively, the program can previously be installed on the ROM 902 or the recording unit 908.

Herein, the processes that the computer performs in accordance with a program are not necessarily performed chronologically in the order described in the flowchart. In other words, the processes that the computer performs in accordance with a program include processes performed in parallel, or individually (for example, parallel processing or object processing). Furthermore, the program can be executed by a computer (processor), or by the decentralized processing with a plurality of computers.

Note that the embodiments of the present technology are not limited to the embodiments describe above, and can variously be changed without departing from the gist of the present technology.

Alternatively, the present technology can have the following configuration.

(1)

A transmission device including:

a metadata generation unit that generates metadata about text-to-speech utterance of display information, the text-to-speech utterance being performed as a producer intends;

an electronic program information generation unit that generates electronic program information including the metadata; and a transmission unit that transmits the electronic program information to a reception device capable of displaying the display information.

(2)

The transmission device according to (1), wherein the metadata includes information about utterance of a character string of which pronunciation is not uniquely determined, or a character string difficult to pronounce.

(3)

The transmission device according to (1) or (2), wherein the display information includes information or an icon of a content.

(4)

The transmission device according to (3), further including:

a content acquisition unit that acquires the content, wherein the transmission unit transmits the electronic program information together with the content using a digital broadcast signal.

(5)

The transmission device according to any of (1) to (4), wherein the electronic program information complies with Electronic Service Guide (ESG) prescribed in Open Mobile Alliance-Mobile Broadcast Services Enabler Suite (OMA-BCAST), the metadata is described in a Speech Synthesis Markup Language (SSML) format, and a predetermined fragment included in the ESG includes address information indicating an address at which a file of the metadata described in the SSML format is acquired, or content of the metadata described in the SSML format.

(6)

A transmission method for causing a transmission device to perform a process, the process including:

generating metadata about text-to-speech utterance of display information, the text-to-speech utterance being performed as a producer intends;

generating electronic program information including the metadata; and transmitting the electronic program information to a reception device capable of displaying the display information.

(7)

A reception device including:

a reception unit that receives electronic program information, the electronic program information being transmitted from a transmission device, the electronic program information including the metadata about text-to-speech utterance of display information, the text-to-speech utterance being performed as a producer intends;

a metadata acquisition unit that acquires the metadata included in the electronic program information; and a text-to-speech reading aloud unit that reads the display information aloud on the basis of the metadata.

(8)

The reception device according to (7), wherein the metadata includes information about utterance of a character string of which pronunciation is not uniquely determined, or a character string difficult to pronounce.

(9)

The reception device according to (7) or (8), wherein the display information includes information or an icon of a content.

(10)

The reception device according to (9), wherein the reception unit receives the electronic program information transmitted together with the content as a digital broadcast signal.

(11)

The reception device according to any of (7) to (10), wherein the electronic program information complies with ESG prescribed in OMA-BCAST, the metadata is described in an SSML format, a predetermined fragment included in the ESG includes address information indicating an address at which a file of the metadata described in the SSML format is acquired, or content of the metadata described in the SSML format, and the metadata acquisition unit acquires the file of the metadata in accordance with the address information, or acquires the metadata from the fragment.

(12)

A reception method for causing a reception device to perform a process, the process including:

receiving electronic program information, the electronic program information being transmitted from a transmission device, the electronic program information including the metadata about text-to-speech utterance of display information, the text-to-speech utterance being performed as a producer intends;

acquiring the metadata included in the electronic program information; and reading the display information aloud on the basis of the metadata.

REFERENCE SIGNS LIST

1 Broadcasting system
10 Transmission device
20 Reception device
111 Content acquisition unit
112 Text-to-speech utterance metadata generation unit
113 ESG information generation unit
114 Stream generation unit
115 Transmission unit 212 Reception unit
213 Stream separation unit
214 Reproduction unit
215 Display unit
216 Loudspeaker
217 ESG information acquisition unit
218 Text-to-speech utterance metadata acquisition unit
219 TTS engine
900 Computer
901 CPU

The invention claimed is:

1. A transmission device, comprising:
one or more processors configured to
generate a fragment of a service guide, the fragment includes a display information element of display information and an extension of the display information element relating to speech phonetic information of the display information; and
transmit the fragment to a reception device,
wherein
the extension of the display information element includes a speech information object in a speech information sub-element of the display information element and includes an attribute indicating a format of the speech information object, and/or
the extension of the display information element includes address information in a speech information Uniform Resource Identifier (URI) sub-element of the display information element, the address information indicating a speech information object location, and includes an attribute indicating a format of a speech information object referenced by the address information.

2. A reception device, comprising:
one or more processors configured to
receive a fragment of a service guide from a transmission device, wherein the fragment includes a display information element of display information and an extension of the display information element relating to speech phonetic information of the display information;
control display of the display information based on the display information element; and
control reading of the display information aloud based on the extension of the display information element,
wherein
the extension of the display information element includes a speech information object in a speech information sub-element of the display information element and includes an attribute indicating a format of the speech information object, and/or
the extension of the display information element includes address information in a speech information Uniform Resource Identifier (URI) sub-element of the display information element, the address information indicating a speech information object location, and includes an attribute indicating a format of a speech information object referenced by the address information.

3. The reception device according to claim 2, wherein the one or more processors is further configured to:
control display of an electronic service guide screen for selecting a station of a broadcast program based on the display information element;
control reading of the display information aloud based on the extension of the display information element with text-to-speech processing.

4. The reception device according to claim 2, wherein the fragment is a service fragment or a content fragment.

5. The reception device according to claim 2, wherein the display information element is a name element or a description element of the fragment.

6. The reception device according to claim 2, wherein the display information is a description of a service or a description of a content.

7. The reception device according to claim 2, wherein the display information is an icon of a service or an icon of a content.

8. The reception device according to claim 2, wherein the extension of the display information element includes the speech information object and the speech information object is described in Speech Synthesis Markup Language (SSML) format.

9. The reception device according to claim 2, wherein the reception device includes a display and a speaker.

10. The reception device according to claim 9, wherein the one or more processors are further configured to output the reading of the display information aloud from the speaker.

11. A reception method of a reception device, the method comprising:
receiving a fragment of a service guide from a transmission device, wherein the fragment includes a display information element of display information and an extension of the display information element relating to speech phonetic information of the display information;
controlling display of the display information based on the display information element; and
controlling reading of the display information aloud based on the extension of the display information element,
wherein
the extension of the display information element includes a speech information object in a speech information sub-element of the display information element and includes an attribute indicating a format of the speech information object, and/or
the extension of the display information element includes address information in a speech information Uniform Resource Identifier (URI) sub-element of the display information element, the address information indicating a speech information object location, and includes an attribute indicating a format of a speech information object referenced by the address information.

12. The reception method of the reception device according to claim 11, the method further comprising:
controlling display of an electronic service guide screen for selecting a station of a broadcast program based on the display information element; and
controlling reading of the display information aloud based on the extension of the display information element with text-to-speech processing.

13. The reception method of the reception device according to claim 11, wherein the fragment is a service fragment or a content fragment.

14. The reception method of the reception device according to claim 11, wherein the display information element is a name element or a description element of the fragment.

15. The reception method of the reception device according to claim 11, wherein the display information is a description of a service or a description of a content.

16. The reception method of the reception device according to claim 11, wherein the display information is an icon of a service or an icon of a content.

17. The reception method of the reception device according to claim 11, wherein the extension of the display information element includes the speech information object and the speech information object is described in Speech Synthesis Markup Language (SSML) format.

18. The reception method according to claim 11, wherein the reception method comprises outputting the reading of the display information aloud from a speaker of the reception device.

* * * * *